Jan. 24, 1967  J. D. HENDRICKSON ETAL  3,299,467
APPARATUS FOR CLEANING CRABS
Filed June 28, 1965  2 Sheets-Sheet 1
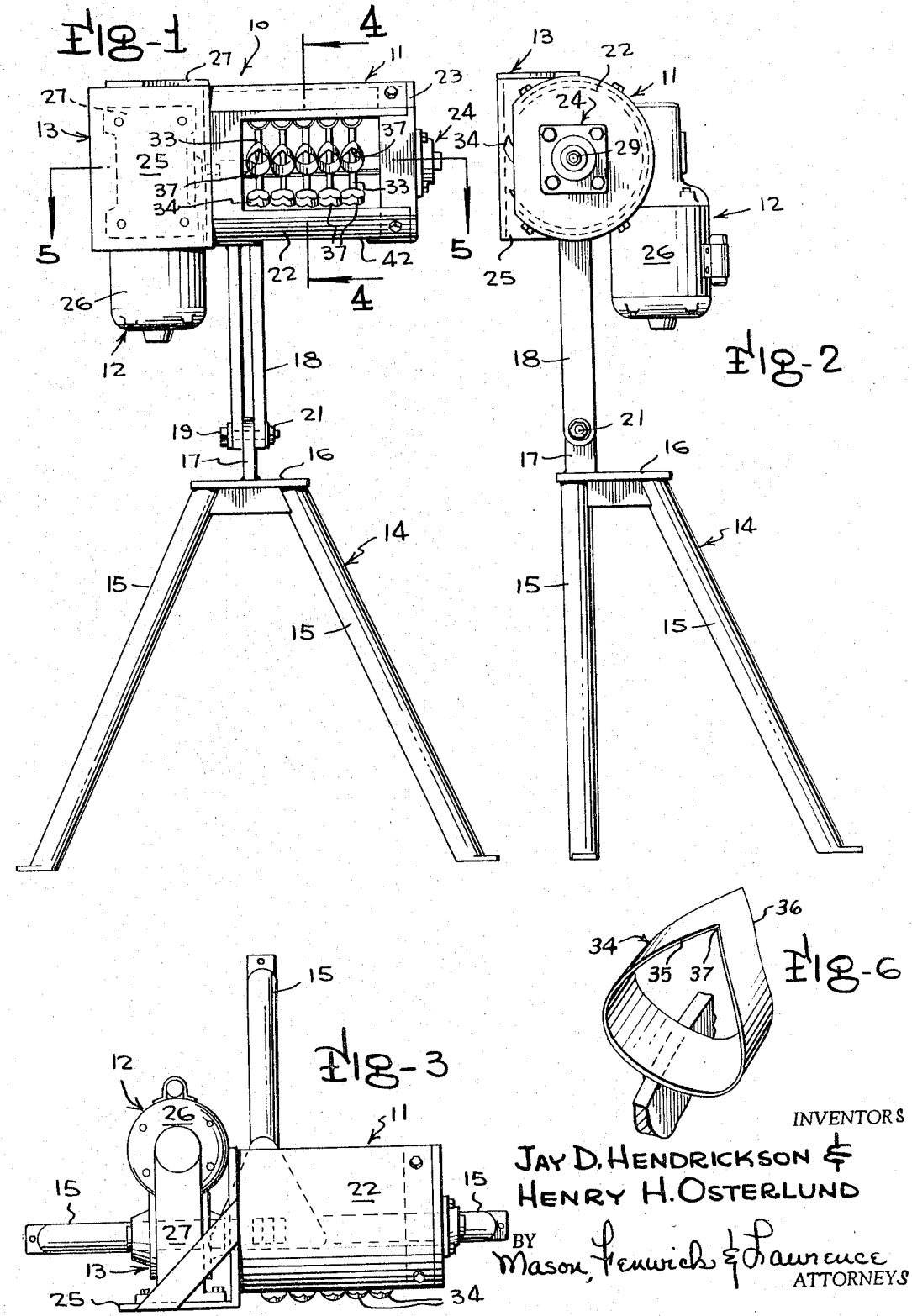
INVENTORS
JAY D. HENDRICKSON &
HENRY H. OSTERLUND
BY Mason, Fenwick & Lawrence
ATTORNEYS Jan. 24, 1967   J. D. HENDRICKSON ET AL   3,299,467
APPARATUS FOR CLEANING CRABS
Filed June 28, 1965   2 Sheets-Sheet 2
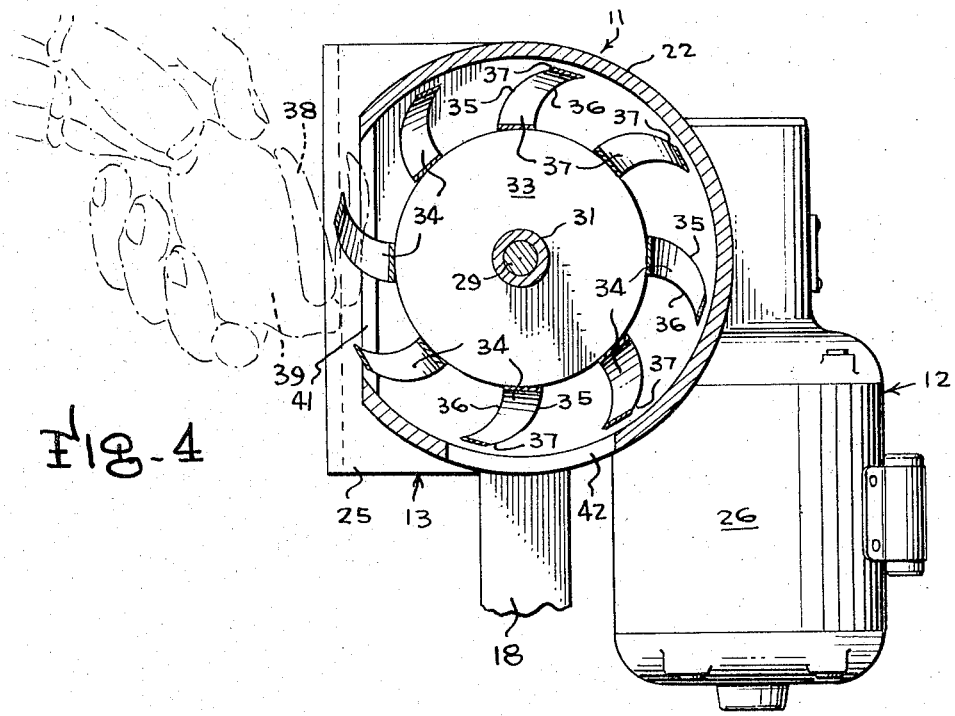
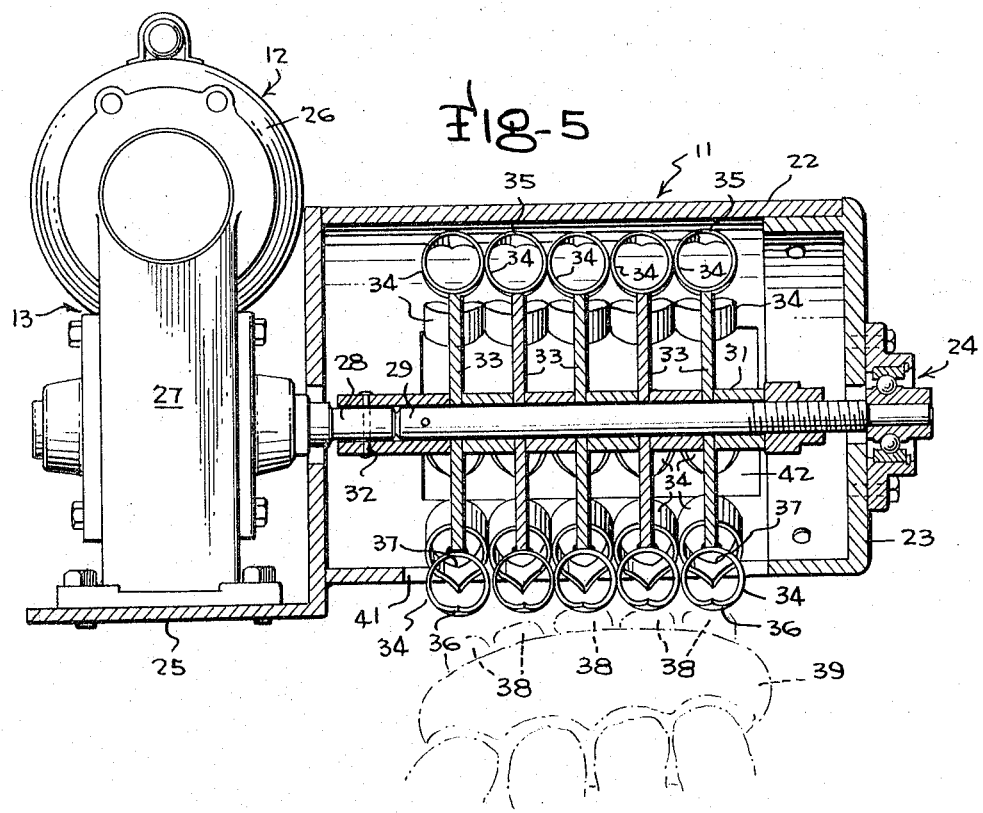

3,299,467
APPARATUS FOR CLEANING CRABS
Jay D. Hendrickson and Henry H. Osterlund, Astoria, Oreg., assignors to C.W.C. Fisheries, Inc., Seattle, Wash., a corporation of Alaska
Filed June 28, 1965, Ser. No. 467,610
5 Claims. (Cl. 17—2)

The present invention relates in general to apparatus used in cleaning crabs and more particularly to a device for removing the gills from the king crab.

In the king crab it is imperative that the gills be removed from the body prior to processing, and especially prior to cooking of the crab meat. If the gills are left upon the crab body during cooking, their presence in this stage of processing reacts adversely upon the quality of the finally prepared crab meat. Until this invention, the only known effective method of removing the gills from the king crab was by hand. This, of course, proved to be extremely uneconomical, and if not done properly, hand removal tended to damage the adjacent edible flesh of the crab body.

Therefore, an object of this invention is the provision of apparatus designed for removing the gills from the raw king crab quickly, efficiently, and economically without damage to the adjacent edible flesh of the crab body.

Another object of this invention is the provision of apparatus for removing gills from the body of the king crab in which one or more rotating tubular cutters are adapted to ensnare the gills of the crab and strip them from the body without damage to the adjacent membrane which protects the edible portion of the crab body meat.

Another object of this invention is the provision of a particular type of cutter having a configuration especially designed to strip the gills from the crab body.

Other objects, advantages, and capabilities of the invention will become apparent from the following description, taken in conjunction with the accompanying drawings showing only a preferred embodiment of the invention.

In the drawings:
FIGURE 1 is a front elevation view of the crab cleaning apparatus of the present invention;
FIGURE 2 is a side elevation view thereof;
FIGURE 3 is a top plan view thereof;
FIGURE 4 is a vertical section view taken along lines 4—4 of FIGURE 1;
FIGURE 5 is a horizontal section view taken along lines 5—5 of FIGURE 1; and
FIGURE 6 is a front perspective view of one of the cutters of the invention.

Referring to the drawings wherein like reference characters designate corresponding parts throughout the several figures, the crab cleaning apparatus or machine of the present invention is indicated generally by the numeral 10. Comprising the machine 10 is a cutter assembly 11, a motor assembly 12, a power transfer means 13, and a support stand 14. The support stand 14 comprises tripod legs 15 which are interconnected at the top by a mounting plate 16. Attached to the mounting plate 16 is a fixed mount 17 which has pivotally interconnected thereto an adjustable support 18 connected for pivotal movement, to the mount 17 by screw 19 and nut 21. Mounted atop the adjustable support 18 is the cutter assembly 11 comprising an elongated generally cylindrical cutter housing 22 having attached at one end an end bell 23 and bearing means 24. At the other end of the cutter housing 22 the end opening is closed by an L shaped motor mount 25 wherein there is mounted upon the short leg of the L the power transfer means 13 to which is attached in operable relation the motor assembly 12.

The motor assembly 12 and the power transfer means 13 are not important to the present invention and have been shown only for environmental purposes. Generally these elements comprise a suitable drive motor 26 whose output shaft (not shown) interconnects with suitable gearing (not shown) within gear housing 27. The output drive shaft 28 of the gear housing projects through the long leg of the L 25 into the cutter housing 22. Drive shaft 28 then interconnects with a support shaft 29 which terminates in operable relation with the bearing means 24. Constructed about the drive shaft 28 and support shaft 29 is a hub mounting shaft 31 which is keyed to the drive shaft 28 by the key pin 32 so that it rotates therewith. Secured to the hub shaft 31 are a plurality of cutter mounting hubs or disks 33 which may vary in number from one up to any desired quantity to accomplish the task desired. Generally these hubs 33 are relatively thin disks which are securely mounted to the shaft 31 and separated by a distance which generally corresponds to the average spacing of the gills of the king crab.

Mounted about the periphery of the disks 33 are cutters 34 having generally a raked back tubular configuration. The cutters 34 each have a leading edge 35 and a trailing edge 36 wherein the periphery of the leading edge is interrupted at a point remote from the mounting disk to form a V shaped inlet 37. The apex of the V is positioned so that its points toward the trailing edge 36. The rotation of the cutters is in such a direction that the open end of the leading edge of the cutter, and especially the V shaped inlet 37, presents itself to the crab gill 38 to properly ensnare the gill and remove it from the crab body 39.

So that the operator of the device may easily present the gills 38 to the leading edge of the cutter 35, the housing 22 has a front opening 41 which extends across the entire width of the cutters 34, depending, of course, upon the number of cutters mounted in the machine. As will be seen from the FIGURE 4 the cutters rotate toward the front opening 41 so that they will extend out of the front opening a sufficient distance so that leading edge of the cutters will pick up the gills if the gills are placed within the rotating path of the cutters. Once the gills have been removed, they are carried by the cutters to the bottom of the cutter housing 22 from which they are discharged through the bottom discharge opening 42.

In operating the present invention, it is anticipated that the cutters would be revolved in the range of 50 to 150 r.p.m.'s which gives a range of speeds low enough so that the operator may present the crab body and gill structure to the cutters as they rotate by the front opening 41.

The king crab itself is prepared by removing the back of the crab and then the crab is broken in half and each half in turn is manually held with the body side downward and the leg side upward. This presents the gills to the cutters 34 in standing fashion, and since the crab body generally is of convex shape, the operator rolls the crab body across the path of the cutters 34. Because each half of the crab body has five gills it is anticipated that maximum utilization of the machine would be had when there are five disks 33 upon which the cutters 34 are mounted. This would then give each gill a series of rotating cutters so that the operator would not have to laterally move the crab body across the path of the cutters. As the gills are presented to the path of the cutters 34, the leading edge 35 channels the gills into the V-shaped inlet 37 wherein they are ensnared and gently pulled off without harm to the membrane to which the gill is attached. Since the body crab meat lies beneath the gill membrane, any damage to the membrane would mean that a certain quantity of crab meat would be lost during the cooking process. Therefore, it is important that the drive shaft 28 not revolve any faster or any slower than the speed required to gently pull the gills from the body 39 in such a manner that the membrane underneath the gills is not disturbed.

While I have particularly shown and described one particular embodiment of the invention, it is distinctly understood that the invention is not limited thereto but that modifications may be made within the scope of the invention and such variations as are covered by the scope of the appended claims.

What is claimed is:

1. Apparatus for cleaning crabs and removing gills therefrom comprising an elongated cylindrical housing, the longitudinal axis of the housing lying in a horizontal plane, a supporting stand for the housing, a first opening in the housing lying perpendicular to the horizontal plane, a second opening in the housing, a support shaft lying along the longitudinal axis of the housing, journal means in the housing for rotatably supporting the support shaft, drive means associated with the housing adapted to rotate the support shaft, power transfer means operatively interconnecting the drive means with the support shaft, a plurality of cutting means mounted for rotation with the support shaft and driven by the power transfer means, the cutting means each comprising a circular cutter mounting disk, a plurality of tubular cutters mounted on the periphery of each mounting disk, the cutters adapted to extend through the first opening in the housing during a portion of each revolution of the support shaft whereby when the gills of the crab are presented to the first opening the rotating tubular cutters ensnare and sever the gills from the crab body and discharge the removed gills through the second opening.

2. Apparatus for cleaning crabs and removing gills therefrom comprising an elongated cylindrical housing, the longitudinal axis of the housing lying in a horizontal plane, a supporting stand for the housing, a first opening in the housing lying perpendicular to the horizontal plane of the axis, a second opening in the housing, a support shaft lying along the longitudinal axis of the housing, journal means in the housing for rotatably supporting the support shaft, drive means associated with the housing adapted to rotate the support shaft, power transfer means operatively interconnecting the drive means with the support shaft, a plurality of cutting means mounted for rotation with the support shaft and driven by the power transfer means, the cutting means each comprising a circular cutter mounting disk, a plurality of tubular cutters mounted on the periphery of each mounting disk, each cutter having a leading edge and a trailing edge, the cutters adapted to extend through the first opening in the housing during a portion of each revolution of the support shaft whereby when the gills of the crab are presented to the first opening the rotating tubular cutters ensnare and sever the gills from the crab body and discharge the removed gills through the second opening.

3. Apparatus for cleaning crabs and removing gills therefrom comprising an elongated cylindrical housing, the longitudinal axis of the housing lying in a horizontal plane, a supporting stand for the housing, a first opening in the housing lying perpendicular to the horizontal plane of the axis, a second opening in the housing, a support shaft lying along the longitudinal axis of the housing, journal means in the housing for rotatably supporting the support shaft, drive means associated with the housing adapted to rotate the support shaft, power transfer means operatively interconnecting the drive means with the support shaft, a plurality of cutting means mounted for rotation with the support shaft and driven by the power transfer means, the cutting means each comprising a circular mounting disk, a plurality of tubular cutters mounted on the periphery of each mounting disk, each cutter having a leading edge and a trailing edge, the periphery of the leading edge being interrupted at a point remote from the mounting disk to form a V-shaped inlet, the cutters adapted to extend through the first opening in the housing during a portion of each revolution of the support shaft whereby when the gills of the crab are presented to the first opening the V-shaped inlet portion of the rotating tubular cutters ensnare and sever the gills from the crab body and discharge the removed gills through the second opening.

4. Apparatus for cleaning crabs and removing gills therefrom comprising an elongated cylindrical housing, the longitudinal axis of the housing lying in a horizontal plane, a supporting stand for the housing, a first opening in the housing lying perpendicular to the horizontal plane of the axis, a second opening in the housing, a support shaft lying along the longitudinal axis of the housing, journal means in the housing for rotatably supporting the support shaft, drive means associated with the housing adapted to rotate the support shaft, power transfer means operatively interconnecting the drive means with the support shaft, a plurality of cutting means mounted for rotation with the support shaft and driven by the power transfer means, the cutting means each comprising a circular cutter mounting disk, a plurality of tubular cutters mounted on the periphery of each mounting disk, each cutter having a leading edge and a trailing edge, the periphery of the leading edge being interrupted at a point remote from the mounting disk to form a V-shaped inlet, the apex of the V positioned so that it points toward the trailing edge, the cutters adapted to extend through the first opening in the housing during a portion of each revolution of the support shaft whereby when the gills of the crab are presented to the first opening the V-shaped inlet portion of the rotating tubular cutters ensnare and sever the gills from the crab body and discharge the removed gills through the second opening.

5. Apparatus for cleaning crabs and removing gills therefrom comprising an elongated cylindrical housing, the longitudinal axis of the housing lying in a horizontal plane, a supporting stand for the housing, a first opening in the housing lying perpendicular to the horizontal plane of the axis, a second opening in the housing, a support shaft lying along the longitudinal axis of the housing, journal means in the housing for rotatably supporting the support shaft, drive means associated with the housing adapted to rotate the support shaft, power transfer means operatively interconnecting the drive means with the support shaft, a plurality of cutting means mounted for rotation with the support shaft and driven by the power transfer means, the cutting means each comprising a circular cutter mounting disk, a plurality of tubular cutters mounted on the periphery of each mounting disk, each cutter having a leading edge and a trailing edge, the periphery of the leading edge being interrupted at a point remote from the mounting disk to form a V-shaped inlet, the apex of the V positioned so that it points toward the trailing edge, the rotation of the cutters being in the direction of the open end of the V-shaped inlet, the cutters adapted to extend through the first opening in the housing during a portion of each revolution of the support shaft whereby when the gills of the crab are presented to the first opening the V-shaped inlet portion of the rotating tubular cutters ensnare and sever the gills from the crab body and discharge the removed gills through the second opening.

References Cited by the Examiner

UNITED STATES PATENTS

| | | | |
|---|---|---|---|
| 912,161 | 2/1909 | Peifer | 168—48 |
| 2,263,695 | 11/1941 | Grayson | 17—2 |
| 3,191,221 | 6/1965 | Kesler et al. | 17—11 |

LUCIE H. LAUDENSLAGER, *Primary Examiner.*